Oct. 31, 1939.  H. W. SIMPSON  2,177,951

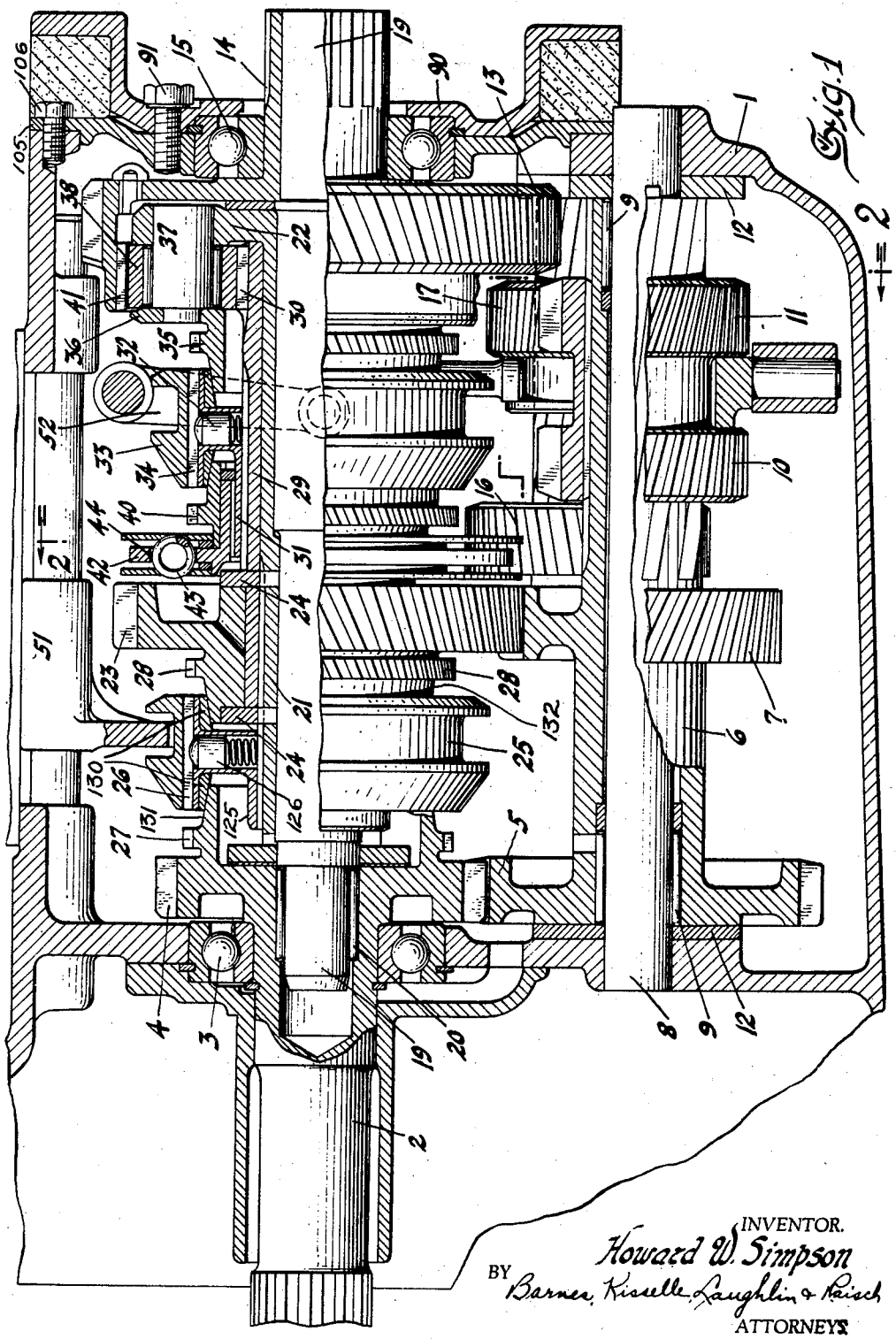

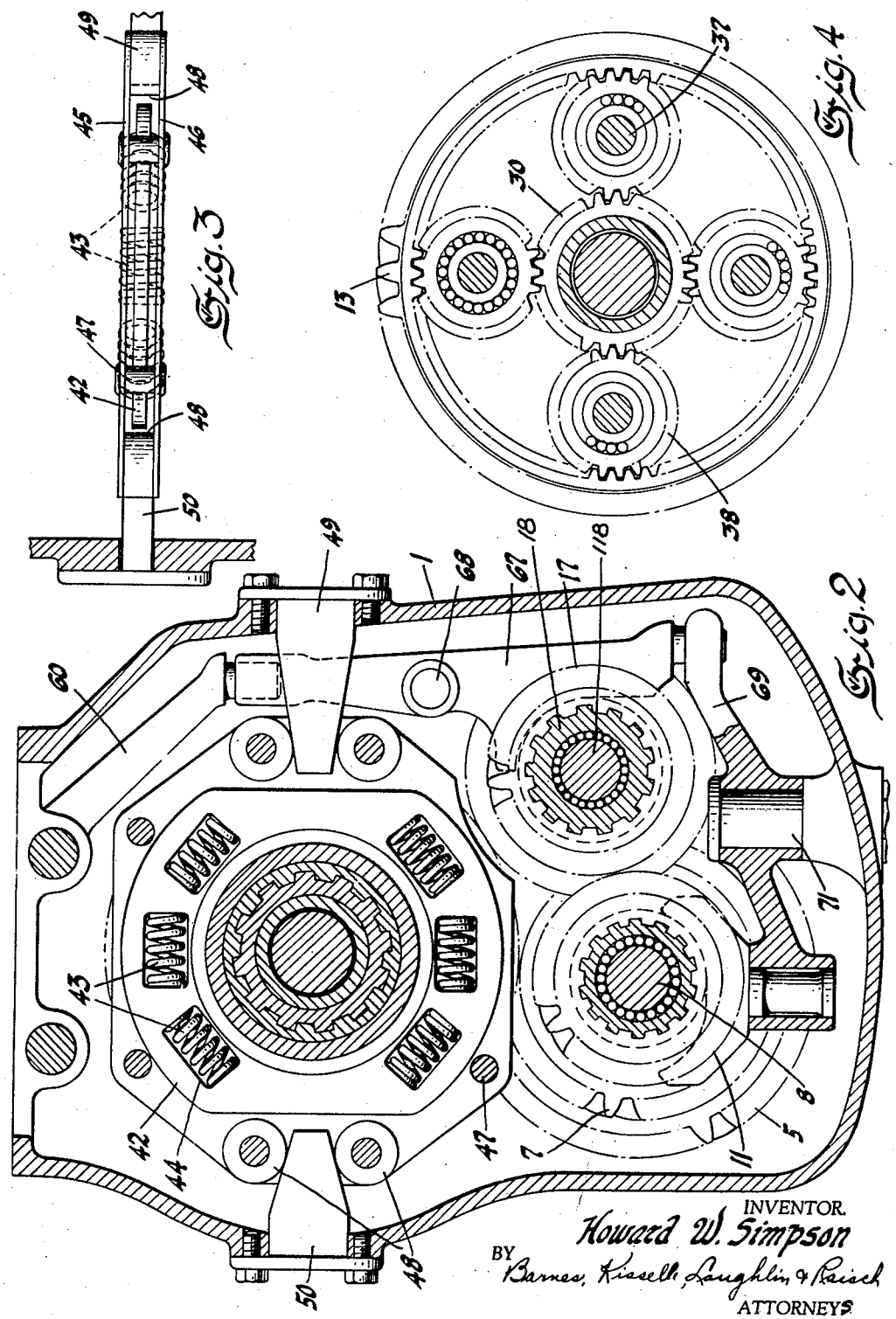

TRANSMISSION

Filed Feb. 24, 1936  4 Sheets-Sheet 3

INVENTOR.
Howard W. Simpson
BY Barnes, Kisselle, Laughlin & Raisch
ATTORNEYS

Oct. 31, 1939.    H. W. SIMPSON    2,177,951
TRANSMISSION
Filed Feb. 24, 1936    4 Sheets-Sheet 4

INVENTOR.
Howard W. Simpson
BY Barnes, Kisselle, Laughlin & Raisch
ATTORNEYS.

Patented Oct. 31, 1939

2,177,951

UNITED STATES PATENT OFFICE 2,177,951

TRANSMISSION

Howard W. Simpson, Dearborn, Mich., assignor to Ford Motor Company, Dearborn, Mich., a corporation of Delaware Application February 24, 1936, Serial No. 65,204

10 Claims. (Cl. 74—328)

This invention relates to a transmission and more particularly to a transmission having a built in overdrive.

It is an object of this invention to produce a transmission having a built in overdrive which is compact and in which the transmission housing is no larger than that heretofore required for the conventional three speed forward transmission now being used on this year's automobile models.

It is an object of this invention to produce a transmission having an overdrive which can be used the greater part of the time even for city driving and in which the "get away" or acceleration is not sacrificed at any time and in which the overdrive gears are never subjected to the heavy low speed torque. This object has been achieved by so constructing the overdrive that the low and reversed gears are not affected by the overdrive.

This invention also contemplates a transmission having a built in overdrive of the planetary gear type in which the wear and tear on the planetary overdrive gears is reduced to a minimum. This has been achieved by arranging the planetary overdrive gears so that they do not spin idly when in direct drive but revolve as a whole with the main transmission shaft.

It is also an object of this invention to cut down the oil churning and tooth friction on the reverse idler gears which occurs in the conventional transmission when driving at high speeds. This wear and tear on the reverse idler has been eliminated by so arranging the reverse idler that it is out of mesh at all times except when the gear shift lever is shifted to reversed position.

In the drawings:

Fig. 1 is a longitudinal section through the transmission having a built in overdrive of the planetary gear type.

Fig. 2 is a section along the line 2—2 of Fig. 1.

Fig. 3 is a top plan view of the resilient braking arrangement for connecting the sun gear to the stationary housing.

Fig. 4 is a vertical section showing the sun and planetary gears.

Figure 5:
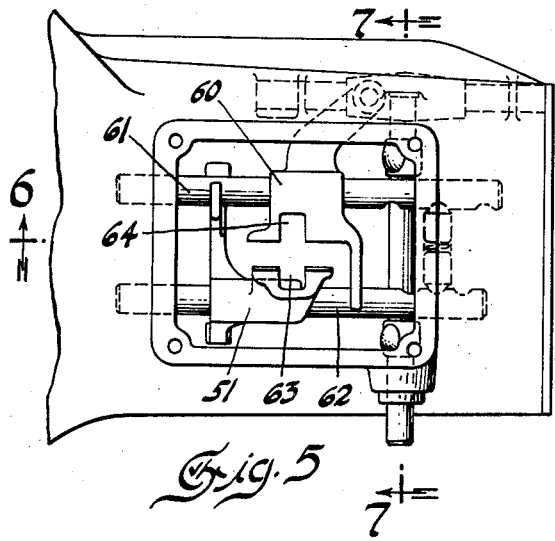
Fig. 5 is a top plan view with the gear shift lever and plate removed showing the gear shifting forks.

Referring more particularly to the drawings there is shown a transmission housing 1 which is compact and the same size as that which now houses the 1936 model Ford transmission having the conventional three speeds forward and one in reverse. The driving shaft 2 is driven by the engine and is rotatably mounted in the transmission housing by the usual ball bearing race 3. The driving shaft is homogeneously formed with a gear 4 which is meshed with and drives the gear 5. This gear 5 is formed homogeneously with the hollow shaft 6 and gear 7. The hollow shaft 6 is supported by the stationary shaft 8 which is fixed at each end to the transmission housing. The hollow shaft 6 is supported upon the fixed shaft 8 by needle roller bearings 9 and is provided at each end with thrust washers 12. A pinion is helically splined on the shaft 6 so that it can be shifted axially of the shaft 6 for low and reverse speeds. This low speed pinion is provided with a circumferential groove for receiving the shifter fork 10. This groove divides the low speed pinion into two pinions 10 and 11 and may be termed a double pinion which in reality serve the purpose of a single pinion.

Figure 8:
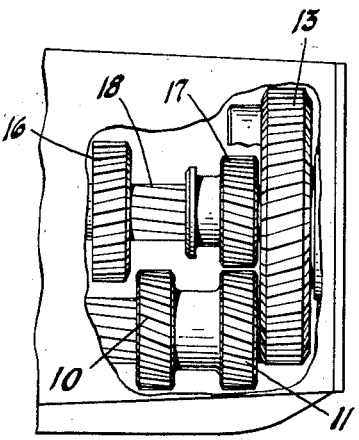
Fig. 8 is a section showing in detail the low and reverse gears.
Figure 9:
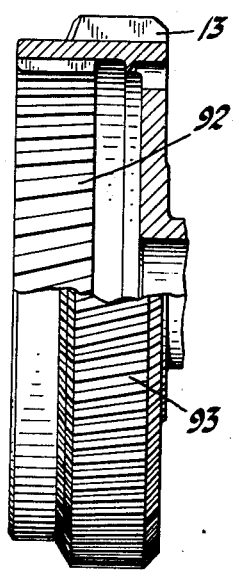
Figs. 9 and 10 are details of the low and reverse gear.

When the double pinion 10, 11 is shifted to the right (Fig. 1) the pinion 11 meshes with the reverse and low speed gear 13 which is integral with the driven shaft 14 and thus low speed drive is obtained. The driven shaft 14 is rotatably supported in the ball bearing race 15 mounted in the end plate 105 of the housing 1. When the double pinion 10, 11 is shifted to the left (Fig. 1) pinion 10 meshes with the idler gear 16 (Figs. 1 and 8) which turns the idler gear 17. The idler gears 16 and 17 are splined on a common support shaft 18 (Fig. 8) and gear 16 is shiftable along the shaft 14. As explained below, the shifting of the double pinion 10, 11 to the left simultaneously shifts the pinion 17 to the right and in mesh with the low speed and reverse gear 13 to effect reverse rotation of the driven shaft 14.

A shaft 19 is supported at one end in the end of the driving shaft 2 upon needle roller bearings 20 and the other end of the shaft has a press fit or is otherwise fixed in the driven shaft 14. The shaft 19 has rotatably mounted thereon the sleeve 21 which is homogeneously formed with the planet gear support spider 22. The intermediate gear 23 is rotatably mounted upon the sleeve 21 and held in position by the thrust washers 24 and a bronze or other suitable bearing. A synchro-mesh clutch is provided for connecting the intermediate gear 23 and driving gear 4 to the sleeve 21. This synchronizing clutch comprises a clutch sleeve 25 splined upon a hub 125 which in turn is splined upon the sleeve 21. The hub 125 is provided with conical clutch facings 130. A detent 126 holds the hub yieldably in center position and in this position the clutch facings 130 have a small clearance with the cooperating conical clutch surfaces 131, 132 respectively homogeneously formed with the driving gear 4 and intermediate gear 23. The sleeve 25 is provided with internal gear teeth 26 arranged to mesh with the small teeth 27 on the gear 4. When the sleeve 25 is moved to the left, Fig. 1, clutch facings 130 and 131 engage thereby synchronizing hub 125 and sleeve 25 with gear 4 and upon further movement of the sleeve 25 to the left the teeth 26 mesh with the teeth 27 on the gear 4. This directly connects the driving shaft 2 and sleeve 21 which, as explained below, gives conventional high speed. When the sleeve 25 is shifted to the right the clutch facing 130 engages the conical face 132 of the intermediate gear to synchronize the sleeve 25 and the intermediate gear and upon further movement to the right the internal gear teeth 26 mesh with the small gear teeth 28 on the intermediate gear 23 thus connecting gear 23 to sleeve 21. Thus, as explained below, giving a speed which is intermediate of low and direct speeds.

Inasmuch as it is one of the objects of this invention to produce a transmission having a built in overdrive which is as compact as the conventional transmission having three speeds forward and one in reverse, such as the transmission now used on the 1936 model Ford, it is proposed to locate the overdrive mechanism between the low speed and intermediate gears. By thus locating the overdrive mechanism the transmission housing remains the same size as that now used with the 1936 model Ford. To this end a sun gear 29 having gear teeth 30 is journaled upon the sleeve 21.

A synchro-mesh clutch is also used either for connecting the sun gear to the planet gear spider or for resiliently connecting the sun gear to the gear housing. This synchronizing clutch device is inserted between plate 36 and the stationary gear 40. This synchronizing clutch device is identical with that described above for connecting the intermediate gear to the shaft 21 and the shaft 21 to the driving gear 4. This synchronizing clutch comprises a hub 31 helically splined on the sun gear 29, a sleeve 33 having internal teeth 34 which is splined on hub 31 and may be shifted to the right or left of center. The sleeve 33 is held yieldably in center position by the spring plunger detent 32. When the sleeve 33 is shifted to the right, internal gear teeth 34 engage the small gear teeth 35 on the plate 36, thus connecting the sun gear and planetary gears so that they move together and no rotation of the planet gears above the sun gear can take place and thus the driving torque coming through sleeve 21 is directly transmitted to the driven gear 13 and driven shaft 14.

The spider 22 has therein four pins 37 upon the outer ends of which is fixed the plate 36. A planet gear 38 is mounted on each of the pins 37 by the plate 36 and spider 22. Suitable needle roller bearings are mounted between the pins 37 and the planet gears 38. If the sleeve 33 is shifted to the left (Fig. 1), internal teeth 34 mesh with the small clutch teeth 40 which, as explained below, are always stationary. This causes the driving torque to be transmitted from the driving shaft 2 to the driven shaft 14 through the planetary gear overdrive. When the teeth 34 and the sleeve 33 are meshed with the small teeth 40, the hub 31 and consequently sun gear 29 to which the hub is splined, is held stationary. The driving torque is transmitted by the sleeve 21 through the flange 22, pins 37, planet gears 38, and then to the driven gear 13 and driven shaft 14. Since the sun gear 29 is held stationary the planet gears 38 revolve about the sun gear 30 and since the planet gears 38 are meshed with the internal teeth 41 of the gear 13 they drive the driven gear 13 at a speed about 38% faster than the speed of sleeve 21. However, since the low and reverse speeds transmit power directly from the driving shaft 2 to the gear 13 and driven shaft 14 without the power passing through the planetary gears, it follows that the planetary gearing does not modify low and reverse speeds but only direct and intermediate speed.

Since it is desirable to shift from conventional into overdrive smoothly and without shock, to this end a novel arrangement is provided for stopping the rotation of the sun gear and holding the same stationary to permit transmission of the power through the planetary gears. This braking arrangement for the sun gear comprises a plate 42 having the clutch teeth 40. The plate 42 is fastened to the transmission housing through the medium of a shock absorber comprising a plurality of helical coil springs 43 mounted in circumferentially spaced openings 44 in the plate 42. The coil springs 43 are held in place by two retaining plates 45 and 46 which are riveted together by circumferentially spaced rivets 47. The rivets 47 are positioned outside of the outer periphery of the plate 42 as shown in Fig. 2 and are provided with spacer washers 48 positioned between the plates 45 and 46. The spacer plates 45 and 46 in turn are supported by the tapered lugs 49 and 50 which are fixed to the transmission housing 1. The tapered ends of the lugs, as shown in Figs. 2 and 3, fit between the plates 45 and 46 and directly engage the top and bottom spacers 48. When the sleeve 33 is shifted to the left, Fig. 1, into engagement with the teeth 40 of the plate 42 the coil springs 43 cushion the initial engagement and absorb the shock which would otherwise be transmitted to the planetary gearing.

The sleeve 25 is shifted by a shifting fork 51 and the sleeve 33 is shifted by a lever 52. The lever 52 preferably is controlled by a separate button or lever mounted on or under the instrument board of the car and connected to the lever 52 by a flexible cable control or wire. The low, reverse, intermediate, and direct or high drives are selected by a hand lever 53 having the overdrive lever independent. The shifts made by the lever 53 are not changed from that of a standard or conventional transmission. Even though the transmission is shifted to overdrive acceleration from a standstill is not sacrificed because the same low gear ratio is obtained regardless of whether the overdrive lever is in "overdrive" or direct.

The gear shifting arrangement is as follows: Shifter forks 51 and 60 are riveted to shafts 62 and 61 respectively. The forks 51 and 60 are provided with notches 63 and 64 respectively. A ball 65 at the bottom of the gear shift lever 53 engages fork 60 in notch 64 and a cylindrical lug 66 on the side of lever 53 engages the fork 51 in notch 63. The lower end of member 60 is fixed in the lower end of fork 67 which slides back and forth on shaft 68. The fork 67 engages idler gear 17 which thus moves it back and forth with fork 67. The lower end of fork 67 is pivotally connected with one end of the lever 69, the other end of the lever 69 being in the form of a fork 70 which engages the low gear pinion 10, 11. The lever 69 is pivotally mounted to swing about a vertical axis intermediate its ends about the vertically positioned pin 71 which is fixed to the housing 1. Thus the shifter fork 51 controls sleeve 25 which upon being moved to the left (Fig. 1) connects the driving shaft 2 with the driven shaft 14 for a direct drive and when the sleeve 25 is shifted to the right the intermediate gear 23 is connected with the sleeve 21 thus permitting the drive to come from driving shaft 2, gear 4 through gears 5 and 7 to intermediate gear 23 thence to sleeve 21 and driven shaft 14.

The overdrive control levers 52 are fixed on a single shaft 80 journaled in the transmission housing 1. The outer end of the shaft 80 has fixed thereto a lever 81 which is attached to the shaft button or lever on the instrument panel by a rod or wire. Levers 52 each have a small shift block 82 at their lower end which are located in the groove of the sleeve 33. As explained above, when the sleeve 33 is shifted to the right (Fig. 1) the overdrive is cut out and the sun and planetary gears are locked together and therefore rotate as a unit with the sleeve 21, driven gear 13 and driven shaft 14. At this time the conventional high or direct drive and the intermediate drive are not modified. However, when the sleeve 33 is shifted to the left (Fig. 1) the sun gear is clutched to the fixed plate 42 thus holding the sun gear stationary permitting the planet gears to revolve about the sun gear and increase the speed of the driven gear 13 and driven shaft 14 about 30% thus modifying the high or direct and intermediate drives.

The end of the transmission housing 1 is provided with a removable end plate 105 which is secured by screws 106 to the housing. The end plate is provided with an opening in which is mounted ball race 15 for driven shaft 14. The ball race 15 is retained in place by the end closure plate 90 which is secured by screws 91 to plate 105. By removing the end plate 105 and plate 90 all of the gears can be assembled through the end of the housing instead of through the top hole of the housing. By being able to assemble the gears through the end of the housing instead of through the hole in the top of the housing it permits one to mount the shifter fork support shafts, such as 61 and 62, within the housing 1 and thus makes a more compact assembly and requires but a small opening in the top of the housing 1.

Figure 10:
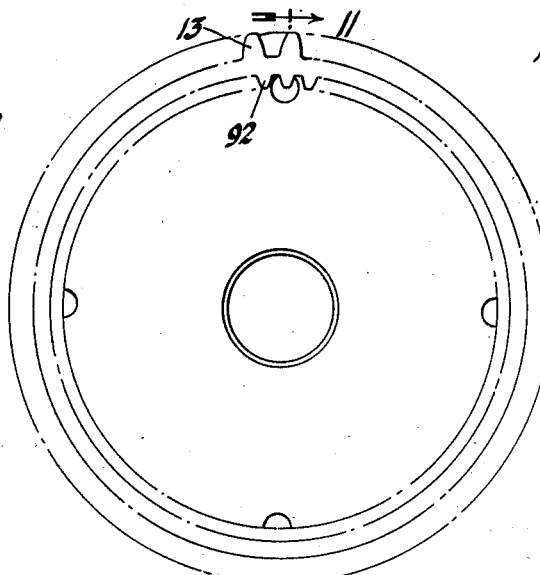
Figure 11:
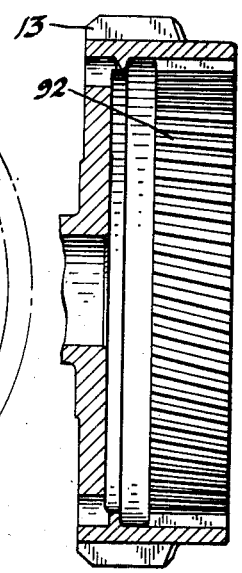
Fig. 11 is a section along the line 11—11 of Fig. 10.

The low and reverse gear 13 is shown in detail in Fig. 10. The gear 13 has the direction of the helix angles or pitch of the internal helical teeth 92 the opposite from that of the external helical teeth 93. As shown, the internal teeth are right handed helical internal teeth and the external teeth are left handed helical teeth. Thus, the teeth reinforce each other and the rim of the gear because of the opposite directions of their helix angles which prevents warping of the gear in heat treatment. Further, the cutting of the internal gear teeth on the inside of the driven gear teeth 13 makes the overdrive assembly more simple and compact.

Figure 12:
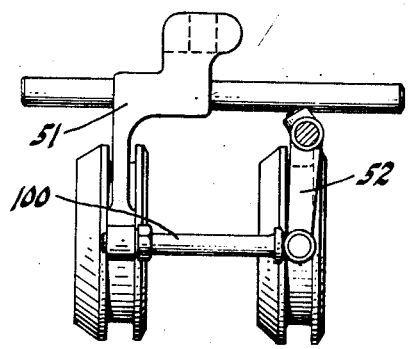
Figs. 12, 13 and 14 are details of a modified form of gear shifting forks for changing the transmission from overdrive to direct drive whenever second speed is engaged.
Figure 14:
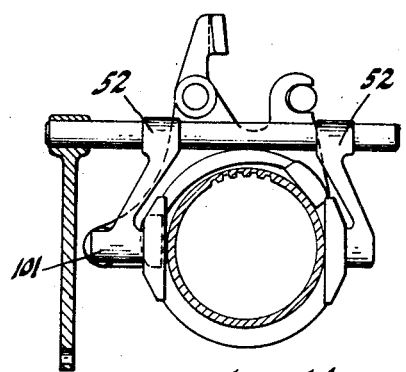
Figure 13:
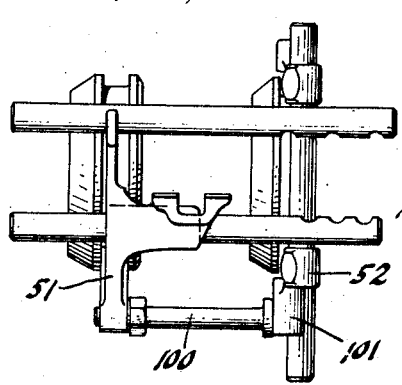

A modified shifter arrangement is shown in Figs. 12, 13 and 14. In this form a rod 100 is attached to the intermediate speed shifter fork 51. This rod is arranged to engage a lug 101 extending out on the overdrive control lever 52. The rod 100 is such that whenever the intermediate speed shifter fork 51 is shifted to intermediate speed the rod 100 pushes the overdrive lever 52 to the right (Fig. 1) in a direct drive when second speed is engaged. The length of the rod 100 is such that whenever the shift is from direct to high speed or neutral the overdrive control lever 52 will be shifted to neutral position. This modified arrangement throws the overdrive out whenever the driver shifts from low to intermediate speeds. If the transmission is an overdrive and the driver desires to shift into intermediate and cut out the overdrive, he need only perform one operation, namely, shift from low to intermediate which through the rod 100 cuts out the overdrive. If one desires to shift from high to neutral, the overdrive is also shifted to neutral and it is then necessary to shift the overdrive as well as the conventional transmission out of neutral to drive the car.

Figure 7:
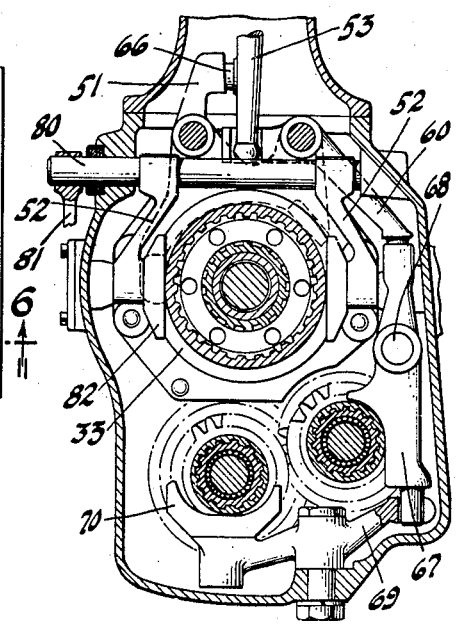
Fig. 7 is a section along the line 7—7 of Fig. 5.
Figure 6:
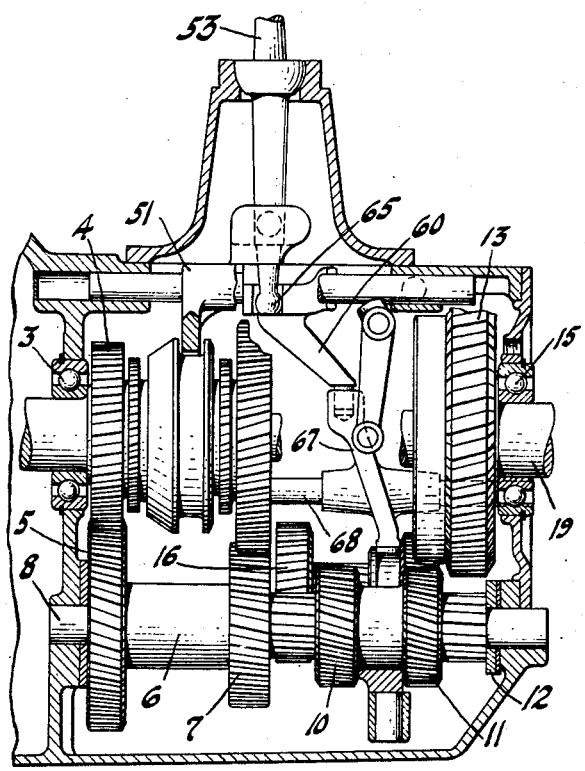
Fig. 6 is a section along the line 6—6 of Fig. 5.

In a view looking in a direction from the driven shaft 19 toward the driving shaft 2, as shown in Figs. 2 and 7, it will be noted that the reverse idler gears 16 and 17 are mounted on the right of the low speed pinions 10, 11. The hollow idler reverse gear shaft is supported on the fixed shaft 118 with suitable needle roller bearings between the hollow shaft 18 and fixed shaft 118. When the transmission is in reverse gear the driving torque is transmitted from the pinion 10 to the idler 16 and then through reverse idler gear 17 to the driven gear 13. Thus the point at which reverse gear 10 meshes with idler gear 16, as well as the point at which idler gear 17 meshes with reverse gear 13, are both on the same side or to the left of the shaft 118. Consequently the thrust on the shaft 118 caused by the transmission of the torque from gear 10 to gear 16 and the thrust caused by the transmission of the torque from gear 17 to gear 13 is generally in the same direction or towards the right as viewed in Fig. 2. This arrangement of the low speed and reverse idler gears is advantageous in that it does not tend to cause uneven wear of the shafts 18, 118 and intervening needle roller bearings and consequent cocking of the idler reverse gears 16 and 17.

I claim:
1. In combination with a driving shaft and a driven shaft, a selective gear transmission comprising a driving gear fixed to the driving shaft, a driven gear fixed to the driven shaft, a main shaft and counter-shaft, a gear mounted on the shaft and freely rotatable thereon, a plurality of gears mounted on the counter-shaft to rotate therewith, a clutch optionally engageable for connecting the freely rotatable gear to the main shaft to rotate therewith and for connecting the main shaft directly to the driving shaft, a planetary gear transmission positioned between the driving and driven gears and selectively operable to modify the driving ratios between the driving and driven shafts when the drive is direct from the driving shaft to the main shaft and when the drive through the said freely rotatable gear to the main shaft, one of said gears on the counter-shaft being shiftable into mesh- ing relation with the driven gear whereby the driving torque is transmitted from the driving shaft through the counter-shaft directly to the driven shaft and around the planetary gear train whereby the planetary gear train is ineffective to modify this driving ratio between the driving and driven shafts.

2. In combination with a driving shaft and a driven shaft, a selective gear transmission comprising a driving gear fixed on the driving shaft and a driven gear fixed on the driven shaft, a plurality of gears between the driving and driven gears some of which are shiftable to effect different driving ratios including a direct drive between the driving and driven shafts, a shaft in axial alignment with the driving and driven shafts for supporting some of the gears, some of the said gears being mounted on said shaft, and a counter-shaft for supporting the other of said gears between the driving and driven gears, a planetary gear transmission mounted on one of the said shafts between the driving and driven gears for modifying the driving ratio when the driving torque is transmitted through any one of the gears mounted on the same shaft as the planetary gear train and ineffective to modify the driving ratio when the driving torque is transmitted from the driving shaft to the gears on the other shaft and then to the driven gear independently of the gears on the shaft on which the planetary gear train is mounted.

3. In combination with a driving shaft and a driven shaft, a selective sliding gear transmission including a driving gear fixed on the driving shaft, a driven gear fixed on the driven shaft, a pair of shafts between the driving and driven gears, a plurality of gears carried by each of the said shafts, some of said gears being shiftable to effect different driving ratios between the driving and driven shafts, a planetary gear train mounted on one of said shafts for modifying the driving ratio whenever the driving torque is transmitted from the driving shaft through the said shaft on which the planetary gear train is mounted, the driving torque being transmitted from the driving shaft through the gears carried by the other of said shafts to the driven gear independently of the planetary gear train.

4. The combination with a driving shaft and a driven shaft, a selective gear transmission including a driving gear fixed to the driving shaft, a driven gear fixed to the driven shaft, the said driven gear comprising a single gear having external and internal gear teeth, a shaft and counter-shaft between the driving and driven gears for transmitting the driving torque from the driving gear to the driven gear, a plurality of gears carried by each of said shafts, some of the gears being shiftable to obtain different driving ratios between the driving and driven gears, a planetary gear train mounted on one of said shafts, and a gear on the other shaft adapted for engagement with the external teeth of the driven gear, the planet gears of the said planetary gear train being meshed with the internal gear of the driven gear whereby the planetary gear train modifies the driving ratio between the driving and driven shafts whenever the driving torque is transmitted through the planetary gear train supporting shaft to the driven shaft and the driving torque can be transmitted from the driving gear through the gears on the other shaft to the driven gear independently of the planetary gear train.

5. In combination with a driving shaft and a driven shaft, a selective sliding gear transmission including a driving gear mounted on the driving shaft, a driven gear mounted on the driven shaft, the driven gear being provided with external gear teeth and internal gear teeth, a shaft and counter-shaft rotatably mounted between the driving and driven gears, a plurality of gears carried by each of said shafts, the first of said shafts having rotatably mounted thereon an intermediate gear, a clutch for selectively connecting the driving shaft directly to the first mentioned shaft or to the intermediate gear, a plurality of gears mounted on the counter-shaft including a pair of gears fixed on the said counter-shaft and meshed respectively with the driving gear and the intermediate gear and a shiftable gear arranged to be shifted along the counter-shaft into meshing relation with the external teeth of the driven gear, a planetary gear train mounted on the first mentioned shaft between the driven gear and the intermediate gear including a plurality of planet gears in meshing engagement with the internal gear teeth of the driven gear, and a clutch fixed to the transmission housing optionally engageable with the sun gear for holding the same stationary whereby the driving ratio in intermediate and direct drives is modified by the planetary gear train and the low drive is transmitted to the driven gear independently of the planetary gear train.

6. In combination with a driving shaft and a driven shaft, a selective sliding gear transmission including a driving gear fixed on the end of the driving shaft and a driven gear fixed on the driven shaft, the said driven gear having external and internal gear teeth, an intermediate gear positioned between the driven gear and the driving shaft, a planetary gear train comprising a sun gear, a plurality of planet gears in meshing relation with the internal teeth of the driven gear and with the sun gear, and a spider for supporting the planet gears, the said spider including a sleeve extending forwardly through the intermediate gear and supported by the driven shaft of the transmission.

7. In combination with a driving shaft and a driven shaft, a selective gear transmission comprising a driving gear fixed to the driving shaft and a low and reverse speed driven gear fixed to the driven shaft, a planetary gear train overdrive mounted between the driving gear and the low and reverse speed driven gear, the said planetary gear overdrive including a driven gear which is integral with the low and reverse speed driven gear whereby the two driven gears rotate as a unit.

8. In a selective gear transmission for transmitting the driving torque from a driving shaft to a driven shaft including a driven gear mounted on the driven shaft, a counter-shaft, a low speed pinion splined on the counter-shaft, a reverse idler shaft, a pair of reverse idler pinions splined on the reverse idler shaft, the said low speed pinion on the counter-shaft being shiftable into meshing engagement with the driven gear to obtain low speed driving ratio, one of the reverse idler pinions being shiftable into driving relation with the said driven gear, and means for simultaneously shifting the pinion on the counter-shaft into meshing engagement with one of the reverse idler gears, and the other reverse idler gear into meshing engagement with the driven gear.

9. In a selective gear transmission, a low speed forward and reverse gear mechanism comprising a low speed forward and reverse driven gear, a low speed driving pinion shiftable in a predetermined direction into mesh with the low speed forward and reverse driven gear to effect low speed forward driving of the driven gear, a reverse idler pinion shiftable in the same predetermined direction into mesh with the same low speed forward and reverse driven gear to effect reverse driving of the driven gear, and means interconnecting the low speed driving pinion and the reverse idler pinion whereby when the low speed driving pinion is shifted in said predetermined direction the reverse idler pinion is shifted in the opposite direction and when the reverse idler pinion is shifted in said predetermined direction the low speed driving pinion is shifted in the opposite direction.

10. In a transmission, the combination of a housing, axially aligned driving and driven shafts therein, a countershaft journaled for rotation in said housing and driven from said driving shaft, a sleeve journaled on said driven shaft, epicyclic gear means connecting said sleeve with said driven shaft, a gear member fixed to said countershaft, a companion gear member meshing therewith and rotatably mounted on said sleeve, and clutch means movable in one direction on said sleeve to connect said companion gear with said sleeve so as to transmit the drive thereto through said gear means and movable in the other direction on said sleeve to directly connect the latter with said driving shaft.

HOWARD W. SIMPSON.